United States Patent
Subramanian et al.

(10) Patent No.: US 9,204,325 B2
(45) Date of Patent: Dec. 1, 2015

(54) METHODS, SYSTEMS, AND COMPUTER READABLE MEDIA FOR REDUCING THE IMPACT OF FALSE DOWNLINK CONTROL INFORMATION (DCI) DETECTION IN LONG TERM EVOLUTION (LTE) PHYSICAL DOWNLINK CONTROL CHANNEL (PDCCH) DATA

(75) Inventors: Suresh Subramanian, Apex, NC (US); Jong Kwan Choi, Santa Clara, CA (US); Ram Asokan, Cary, NC (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 13/336,005

(22) Filed: Dec. 23, 2011

(65) Prior Publication Data
US 2013/0155872 A1 Jun. 20, 2013

Related U.S. Application Data

(60) Provisional application No. 61/578,228, filed on Dec. 20, 2011.

(51) Int. Cl.
 *H04W 24/06* (2009.01)
(52) U.S. Cl.
 CPC ..................................... *H04W 24/06* (2013.01)
(58) Field of Classification Search
 CPC ....... H04W 24/06; H04L 43/00; H04L 43/50; H04L 1/00; H04B 10/0771
 USPC ................................. 370/241, 242; 455/115.1
 See application file for complete search history.

(56) References Cited

U.S. PATENT DOCUMENTS

| | | |
|---|---|---|
| 5,561,841 A | 10/1996 | Markus |
| 5,850,386 A | 12/1998 | Anderson et al. |
| 6,125,072 A | 9/2000 | Wu |
| 6,771,957 B2 | 8/2004 | Chitrapu |
| 6,996,772 B2 | 2/2006 | Justice et al. |
| 7,543,054 B1 | 6/2009 | Bansod et al. |
| 7,706,347 B2 | 4/2010 | Kim et al. |
| 7,765,313 B2 | 7/2010 | Jain et al. |
| 8,601,585 B2 | 12/2013 | Beddoe et al. |
| 8,693,571 B2 | 4/2014 | Sorrentino |
| 8,724,498 B2 | 5/2014 | Choi et al. |
| 8,738,985 B2 | 5/2014 | Deng et al. |

(Continued)

OTHER PUBLICATIONS

"3rd Generation Partnership Project; Universal Mobile Telecommunications System (UMTS); Evolved Universal Terrestrial Radio Access (E-UTRA); Physical layer for relaying operation (Release 10)," 3GPP TS 36.216, v10.3.1 (Sep. 2011).

(Continued)

*Primary Examiner* — Paul H Masur
*Assistant Examiner* — Kabir Jahangir
(74) *Attorney, Agent, or Firm* — Jenkins, Wilson, Taylor & Hunt, P.A.

(57) ABSTRACT

Methods, systems, and computer readable media for reducing the impact of false downlink control information (DCI) detection in long term evolution (LTE) physical downlink control channel (PDCCH) data are disclosed. According to one method, an LTE multi-UE simulator receives PDCCH data from an evolved node B (eNode B). The LTE multi-UE simulator applies blind DCI decoding to decode at least one DCI value from channel control elements that carry the PDCCH data. The LTE multi-UE simulator applies at least one false DCI detection countermeasure to identify as true or false DCIs from the DCIs detected using the blind decoding.

29 Claims, 5 Drawing Sheets

(56) References Cited

U.S. PATENT DOCUMENTS

| | | | |
|---|---|---|---|
| 8,793,117 | B1 | 7/2014 | Varshney et al. |
| 8,855,070 | B2 | 10/2014 | Deng et al. |
| 8,892,829 | B2 | 11/2014 | Asokan |
| 8,908,535 | B2 | 12/2014 | Campbell et al. |
| 8,929,294 | B2 | 1/2015 | Devarasetty et al. |
| 8,937,882 | B2 | 1/2015 | Devarasetty |
| 2003/0036403 | A1 | 2/2003 | Shiu et al. |
| 2005/0220047 | A1 | 10/2005 | Baey et al. |
| 2006/0262880 | A1 | 11/2006 | Mizuta et al. |
| 2006/0276195 | A1 | 12/2006 | Nordling |
| 2007/0091921 | A1 | 4/2007 | Elliot et al. |
| 2007/0116046 | A1 | 5/2007 | Liu et al. |
| 2009/0052473 | A1 | 2/2009 | Choi et al. |
| 2009/0077456 | A1 | 3/2009 | Pi et al. |
| 2009/0077457 | A1 | 3/2009 | Ramesh et al. |
| 2009/0083234 | A1 | 3/2009 | Yeom et al. |
| 2009/0100300 | A1 | 4/2009 | Kim |
| 2009/0109926 | A1 | 4/2009 | Meylan |
| 2009/0196244 | A1* | 8/2009 | Chun et al. ............ 370/329 |
| 2009/0245187 | A1 | 10/2009 | Nam et al. |
| 2010/0075678 | A1 | 3/2010 | Akman et al. |
| 2010/0165847 | A1* | 7/2010 | Kamuf et al. ............ 370/241 |
| 2010/0184447 | A1 | 7/2010 | Miki et al. |
| 2010/0195743 | A1 | 8/2010 | Barsoum et al. |
| 2010/0272011 | A1 | 10/2010 | Palanki et al. |
| 2010/0290371 | A1 | 11/2010 | Beale |
| 2010/0291940 | A1 | 11/2010 | Koo et al. |
| 2010/0303011 | A1* | 12/2010 | Pan et al. ............ 370/328 |
| 2010/0331030 | A1 | 12/2010 | Nory et al. |
| 2011/0032925 | A1 | 2/2011 | Lee et al. |
| 2011/0044196 | A1 | 2/2011 | Ishii |
| 2011/0076962 | A1* | 3/2011 | Chen et al. ............ 455/68 |
| 2011/0086659 | A1 | 4/2011 | Yoon et al. |
| 2011/0110315 | A1 | 5/2011 | Chen et al. |
| 2011/0119552 | A1 | 5/2011 | Park et al. |
| 2011/0158333 | A1 | 6/2011 | Nakano et al. |
| 2011/0170439 | A1 | 7/2011 | Miki et al. |
| 2011/0199985 | A1 | 8/2011 | Cai et al. |
| 2011/0206151 | A1 | 8/2011 | McCloud et al. |
| 2011/0223900 | A1 | 9/2011 | Yu et al. |
| 2011/0235586 | A1 | 9/2011 | Han et al. |
| 2011/0294497 | A1 | 12/2011 | Hedlund et al. |
| 2011/0302390 | A1 | 12/2011 | Copeland et al. |
| 2012/0014242 | A1 | 1/2012 | Kim et al. |
| 2012/0033650 | A1 | 2/2012 | Ahn et al. |
| 2012/0039246 | A1 | 2/2012 | Zhang et al. |
| 2012/0042226 | A1 | 2/2012 | Ramesh et al. |
| 2012/0051271 | A1 | 3/2012 | Beale |
| 2012/0063384 | A1 | 3/2012 | Bi et al. |
| 2012/0093249 | A1 | 4/2012 | Sun et al. |
| 2012/0094651 | A1* | 4/2012 | Chun et al. ............ 455/422.1 |
| 2012/0150521 | A1 | 6/2012 | Balkwill |
| 2012/0170524 | A1 | 7/2012 | Ren et al. |
| 2012/0204081 | A1 | 8/2012 | Fresia et al. |
| 2013/0010724 | A1* | 1/2013 | Han et al. ............ 370/329 |
| 2013/0024753 | A1 | 1/2013 | Masuda et al. |
| 2013/0034062 | A1* | 2/2013 | Seo et al. ............ 370/329 |
| 2013/0058240 | A1* | 3/2013 | Kim et al. ............ 370/252 |
| 2013/0058294 | A1* | 3/2013 | Miki et al. ............ 370/329 |
| 2013/0058306 | A1* | 3/2013 | Noh et al. ............ 370/329 |
| 2013/0060735 | A1 | 3/2013 | Haddy et al. |
| 2013/0064203 | A1 | 3/2013 | Ogawa |
| 2013/0070689 | A1* | 3/2013 | Liu et al. ............ 370/329 |
| 2013/0070690 | A1* | 3/2013 | Moon et al. ............ 370/329 |
| 2013/0088973 | A1* | 4/2013 | Yang et al. ............ 370/241 |
| 2013/0115987 | A1 | 5/2013 | Yoo et al. |
| 2013/0121168 | A1* | 5/2013 | Luo et al. ............ 370/242 |
| 2013/0121295 | A1* | 5/2013 | Saito et al. ............ 370/329 |
| 2013/0155867 | A1 | 6/2013 | Asokan et al. |
| 2013/0155878 | A1 | 6/2013 | Deng et al. |
| 2013/0184023 | A1 | 7/2013 | Asokan et al. |
| 2013/0208600 | A1 | 8/2013 | Campbell et al. |
| 2013/0208603 | A1 | 8/2013 | Choi et al. |
| 2013/0227092 | A1 | 8/2013 | Maestas |
| 2013/0227233 | A1 | 8/2013 | Asokan |
| 2013/0275606 | A1 | 10/2013 | Iyer |
| 2014/0119213 | A1 | 5/2014 | Devarasetty |
| 2014/0140271 | A1 | 5/2014 | Devarasetty et al. |
| 2014/0185425 | A1 | 7/2014 | Kim et al. |
| 2014/0269361 | A1 | 9/2014 | Asokan et al. |
| 2015/0043356 | A1 | 2/2015 | Awano et al. |

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).

"IxCatapult Chassis," http://www.ixiacom.com/products/display?skey=ch_ixcatapult, pp. 1-2 (Downloaded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-18 (Jan. 2010).

"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).

"PDCCH Blind Decoding," PDCCH Decoding Example, http://www.steepestascent.com, pp. 1-6 (Copyright 2009-2011, dowloaded from the Internet Dec. 4, 2011).

Non-Final Office Action for U.S. Appl. No. 13/431,975 (May 24, 2013).

Non-Final Office Action for U.S. Appl. No. 13/447,160 (Nov. 8, 2013).

Non-Final Office Action for U.S. Appl. No. 13/431,975 (Oct. 10, 2013).

Non-Final Office Action for U.S. Appl. No. 13/326,264 (Oct. 10, 2013).

Non-Final Office Action for U.S. Appl. No. 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013).

Share Technote, "Frame Structure—Downlink," pp. 1-11 http://www.sharetechnote.com/html/FrameStructure_DL.html#PCFICH (Printed from the Internet Aug. 7, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

(56) References Cited

OTHER PUBLICATIONS

3rd Generation Partnership Project, "Technical Specification Group Radio Access Network; Evolved Universal Terrestrial Radio Access (E-UTRA); Physical Channels and Modulation (Release 11)," 3GPP TS 36.211, V11.2.0, pp. 1-109 (Feb. 2013).
3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).
3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).
3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).
Xiao et al., "IMS Network Deployment Cost Optimization Based on Flow-Based Traffic Model," IEEE/IFIP Network Operations and Management Symposium—NOMS 2010, pp. 232-239 (2010).
"Network Topology," http://web.archive.org/web/20081219235147/http://en.wikipedia.org/wiki/Network_topology, pp. 1-9 (Dec. 19, 2008).
Notice of Publication for GB Patent Application No. 1411056.3 (Aug. 11, 2014).
Notice of Allowance and Fee(s) Due for U.S. Appl. No. 13/371,389 (Aug. 8, 2014).
Non-Final Office Action for U.S. Appl. No. 13/352,058 (Aug. 4, 2014).
Notice of Allowance and Fee(s) Due for U.S. Appl. No. 13/408,787 (Jul. 18, 2014).
Non-Final Office Action for U.S. Appl. No. 13/447,160 (Jul. 10, 2014).
Notice of Allowance and Fee(s) Due for U.S. Appl. No. 13/326,264 (Jun. 9, 2014).
Notice of Allowance and Fee(s) Due for U.S. Appl. No. 13/154,166 (Jun. 2, 2014).
Advisory Action for U.S. Appl. No. 13/447,160 (May 29, 2014).
Applicant-Initiated Interview Summary for U.S. Appl. No. 13/447,160 (May 23, 2014).
Applicant-Initiated Interview Summary for U.S. Appl. No. 13/154,166 (Apr. 28, 2014).
Non-Final Office Action for U.S. Appl. No. 13/429,384 (Apr. 9, 2014).
Final Office Action for U.S. Appl. No. 13/447,160 (Mar. 18, 2014).
Final Office Action for U.S. Appl. No. 13/154,166 (Mar. 3, 2014).
Interview Summary for U.S. Appl. No. 13/447,160 (Feb. 25, 2014).
Final Office Action for U.S. Appl. No. 13/326,264 (Feb. 20, 2014).
Non-Final Office Action for U.S. Appl. No. 13/408,787 (Feb. 3, 2014).
Notice of Allowance and Fee(s) Due for U.S. Appl. No. 13/431,975 (Jan. 22, 2014).
Notice of Allowance and Fee(s) Due for U.S. Appl. No. 13/396,577 (Dec. 18, 2013).
3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).
Ikuno et al., "System level simulation of LTE networks," 2010 IEEE 71st Vehicular Technology Conference: VTC2010-Spring, (May 16-19, 2010).
Abbes et al., "Protocol Analysis in Intrusion Detection Using Decision Tree," IEEE, Proceedings of the International Conference on Information Technology: Coding and Computing (ITCC'04), pp. 1-5 (2004).
Sleator et al., "Self-Adjusting Binary Search Trees," Journal of the Association for Computing Machinery. vol. 32, No. 3, pp. 652-686 (Jul. 1985).
Notice of Allowance and Fee(s) Due for U.S. Appl. No. 13/668,203 (Sep. 8, 2014).
Notice of Allowance and Fee(s) Due for U.S. Appl. No. 13/682,663 (Sep. 8, 2014).
Non-Final Office Action for U.S. Appl. No. 13/668,203 (Apr. 29, 2014).
Notification of Transmittal of the International Search Report and the Written Opinion of the International Searching Authority, or the Declaration for International Application No. PCT/US2012/070877 (Mar. 28, 2013).
Dahlman et al., "10.4.9: Blind Decoding of PDCCHs," 4G LTE / LTE-Advanced for Mobile Broadband, pp. 199-202 (2011).
Notice of Allowance and Fee(s) Due for U.S. Appl. No. 13/447,160 (Apr. 30, 2015).
Notice of Allowance and Fee(s) Due for U.S. Appl. No. 13/154,166 (Apr. 13, 2015).
Notice of Allowance and Fee(s) Due for U.S. Appl. No. 13/835,658 (Apr. 3, 2015).
Applicant-Initiated Interview Summary for U.S. Appl. No. 13/447,160 (Mar. 26, 2015).
Advisory Action Before the Filing of an Appeal Brief for U.S. Appl. No. 13/447,160 (Mar. 5, 2015).
Advisory Action, Examiner-Initiated Interview Summary and AFCP 2.0 Decision for U.S. Appl. No. 13/429,384 (Mar. 3, 2015).
Notice of Allowance and Interview Summary of U.S. Appl. No. 13/352,058 (Feb. 5, 2015).
Final Office Action for U.S. Appl. No. 13/447,160 (Dec. 19, 2014).
Schwarz et al., "Pushing the Limits of LTE: A Survey on Research Enhancing the Standard," IEEE Access, vol. 1, pp. 51-62 (May 10, 2013).
Piro et al., "Simulating LTE Cellular Systems: An Open-Source Framework," IEEE Transactions on Vehicular Technology, vol. 60, No. 2, pp. 498-513 (Feb. 2011).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
Dutta et al., "A Tight Lower Bound for Parity in Noisy Communications Networks," Tata Institute of Fundamental Research, pp. 1056-1065 (2008).
"LTE (Long Term Evolution) Testing Systems," http://www.catapult.com/technologies/tech_lte.htm, pp. 1-2 (Jun. 26, 2008).
Nilsson et al., "The Scalable Tree Protocol—A Cache Coherence Approach for Large-Scale Multiprocessors," IEEE, pp. 1-9 (1992).
Fraser, "LTE Channel State Information (CSI),"Agilent Technologies, pp. 1-66 (Copyright 2012).
Rohdes & Schwarz, "R & S® TS 8980 test system analyzes LTE quality indicators: CQI, PMI and RI," News 203/11, pp. 6-9 (2011).
Final Office Action for U.S. Appl. No. 13/429,384 (Nov. 21, 2014).
Non-Final Office Action for U.S. Appl. No. 13/154,166 (Oct. 28, 2014).

\* cited by examiner

METHODS, SYSTEMS, AND COMPUTER READABLE MEDIA FOR REDUCING THE IMPACT OF FALSE DOWNLINK CONTROL INFORMATION (DCI) DETECTION IN LONG TERM EVOLUTION (LTE) PHYSICAL DOWNLINK CONTROL CHANNEL (PDCCH) DATA

PRIORITY CLAIM

This application claims the priority benefit of U.S. Provisional Patent Application Ser. No. 61/578,228, filed Dec. 20, 2011, the disclosure of which is incorporated herein by reference in its entirety.

TECHNICAL FIELD

The subject matter described herein relates to improved decoding of an LTE PDCCH control channel. More particularly, the subject matter described herein relates to methods, systems, and computer readable media for reducing the impact of false DCI detection in LTE PDCCH data.

BACKGROUND

Multi-user-equipment (multi-UE) simulators simulate multiple UEs connected to one or more evolved node Bs (eNode Bs) under test. UEs are wireless devices, such as mobile handsets, and evolved node Bs are the wireless access devices in LTE networks through which the UEs attach to the network. UEs that are connected to an eNode B are hereinafter referred as attached UEs. For each UE being simulated, the multi-UE simulator is required to decode multiple control channels, one of which is referred to as the physical downlink control channel (PDCCH). The PDCCH contains downlink control information (DCI), which contains a resource mapping (e.g., frequencies, modulation, data block length, etc.) for decoding user data transmitted on a different channel, referred to as the physical downlink shared channel (PDSCH) or resource mapping for sending user data on a different channel, referred to as the physical uplink shared channel (PUSCH). During a given transmission time interval (TTI) and/or subframe, the simulator is not aware of the UEs to which the eNode B is sending the control information. Accordingly, the simulator is required to monitor the PDCCH data for all possible DCI values corresponding to attached UEs that might be present in the PDCCH data. Monitoring the control channel includes attempting to decode the PDCCH data with a radio network temporary identifier (RNTI) for each UE being simulated. However, some of the DCIs that are decoded may be false. For example, a DCI may correspond to an attached UE being simulated but for which the eNode B did not transmit a DCI during a given transmission time interval. False DCIs may lead to invalid decoding of PDSCH data, corruption of valid downlink data of another UE, unexpected ACKs and NACKs transmitted on uplink channels and corruption of a valid uplink transmission of another UE.

Accordingly, there exists a need for methods, systems, and computer readable media for reducing the impact of false DCI detection in LTE PDCCH data.

SUMMARY

Methods, systems, and computer readable media for reducing the impact of false DCI detection for LTE PDCCH data are disclosed. According to one method, an LTE multi-UE simulator receives PDCCH data from an eNode B. The LTE multi-UE simulator applies blind DCI decoding to detect or extract at least one DCI value from control channel elements (CCEs) that carry the PDCCH data. The LTE multi-UE simulator applies at least one false DCI detection countermeasure to identify as true or false DCIs from the DCIs detected using the blind decoding.

The subject matter described herein can be implemented using a non-transitory computer readable medium having stored thereon executable instructions that when executed by the processor of a computer control the computer to perform steps. For example, the subject matter described herein can be implemented in software executed by a processor. Exemplary computer readable media suitable for implementing the subject matter described herein also include chip memory devices, disk memory devices, programmable logic devices, including field programmable gate arrays, and application specific integrated circuits. In addition, a computer readable medium that implements the subject matter described herein can be located on a single device or computing platform or may be distributed across plural devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
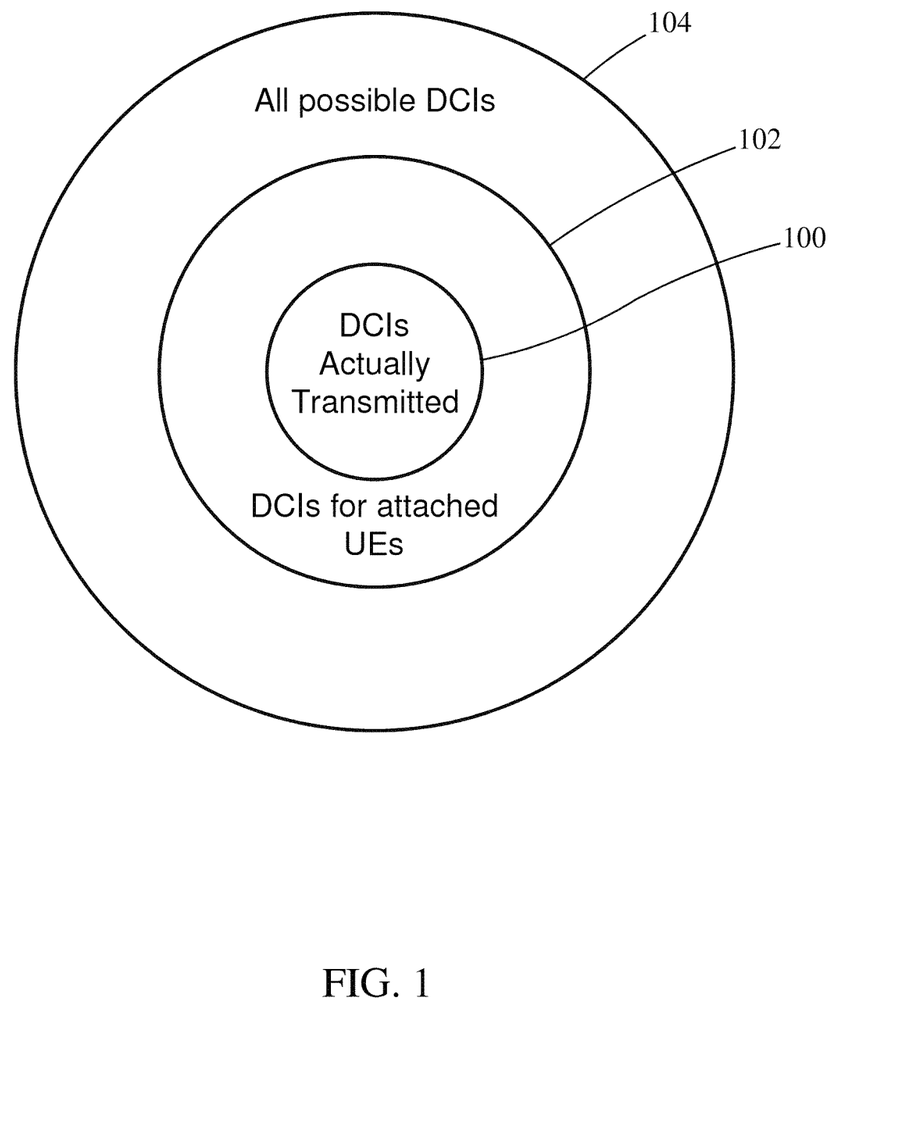
FIG. 1 is a Venn diagram illustrating possible DCI values that can be decoded using blind DCI decoding.

Methods, systems, and computer readable media for reducing the impact of false DCI detection for LTE PDCCH data are disclosed. FIG. 1 is a Venn diagram illustrating the complete universe of possible DCI values that may be decoded by a multi-UE simulator. Referring to FIG. 1, circle 100 represents DCI values of attached UEs that were actually transmitted during a given transmission time interval (TTI) and/or subframe. Circle 102 represents possible DCIs in any TTI for all attached UEs that are being simulated. The area between circles 100 and 102 represents potentially false DCIs for attached UEs (i.e., potentially valid DCIs, but that were not transmitted during a given TTI). Finally, circle 104 represents all possible DCIs in the system that may include UEs not attached. The subject matter described herein seeks to identify DCI values that were actually transmitted, i.e., within circle 100, and exclude from further processing DCIs that are between circles 100 and 102 and between circles 100 and 104.

Figure 2:
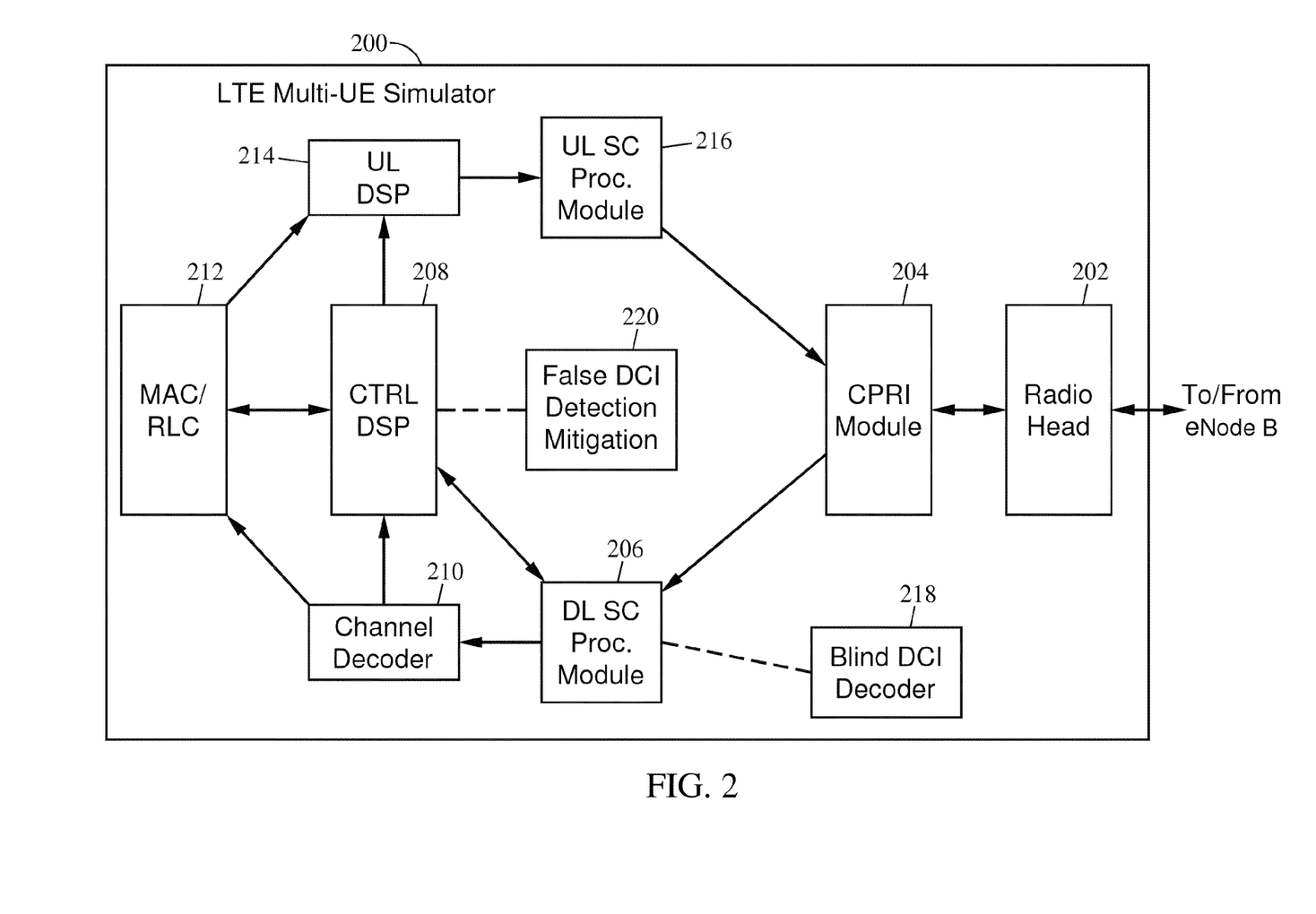
FIG. 2 is a block diagram illustrating an LTE multi-UE simulator configured to perform false DCI detection mitigation according to an embodiment of the subject matter described herein.

In order to perform such false DCI exclusion, a multi-UE simulator may be configured with the ability to implement one or more false DCI detection countermeasures for identifying valid DCIs or true DCIs from DCIs that are detected using blind DCI decoding and for excluding invalid or false DCIs. FIG. 2 is a block diagram illustrating an LTE multi-UE simulator according to an embodiment of the subject matter described herein. Referring to FIG. 2, LTE multi-UE simulator 200 includes a radio head 202 for sending data to and receiving data from an evolved node B over an LTE wireless interface. A common public radio interface (CPRI) module 204 receives data in the downlink direction for further processing and sends data in the uplink direction to radio head 202. Radio head 202 may be internal to or external to LTE multi-UE simulator 200. For example, in one test scenario, radio head 202 may be omitted or bypassed, and CPRI module 204 may connect to a corresponding CPRI interface of an eNode B under test via a wired interface, such as an optical fiber interface.

A downlink signal chain processing module 206 receives and processes downlink data and forwards the control channel data to control DSP 208. At the transmitting side of eNode B, the DCI PDU for each UE goes through standard physical layer processing blocks, such as CRC, channel coding, rate matching, modulation, layer mapping, and it is then mapped to downlink transmission resources assigned to one of the PDCCHs in a subframe. To decode a DCI, simulator 200 must perform the inverse of these operations.

Figure 3:
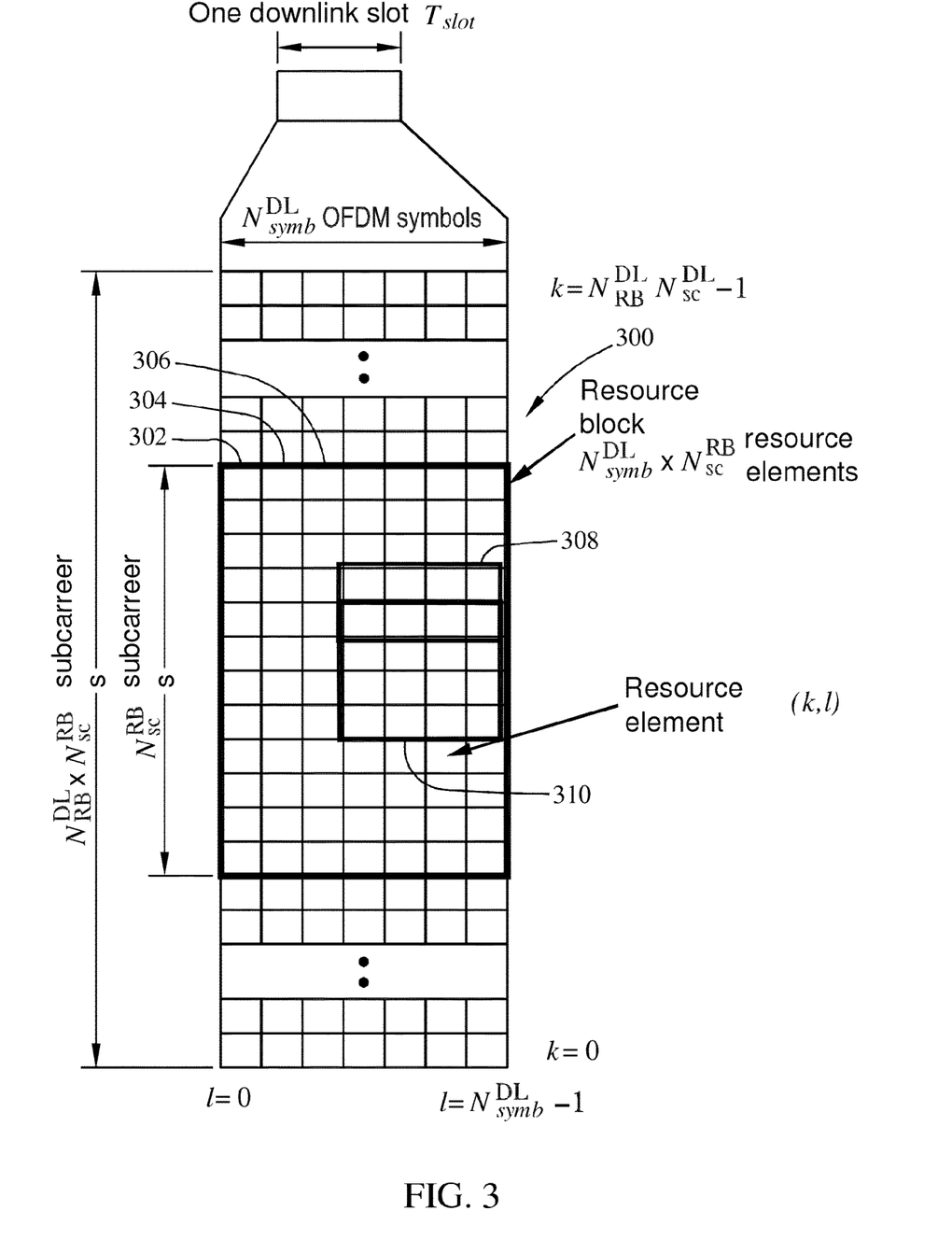
FIG. 3 is a block diagram of a downlink LTE resource grid used to transmit data from an eNode B to an LTE multi-UE simulator according to an embodiment of the subject matter described herein.

FIG. 3 is a diagram illustrating a downlink resource grid that may be used by an eNode B to transmit PDCCH data to simulator 200. Referring to FIG. 3, a downlink resource grid 300 is divided according to time on the horizontal axis and frequency on the vertical axis. Each block in resource grid 300 is referred to as a resource element, i.e., a resource element is one of the cells in resource grid 300. A resource block, indicated by the bold box, contains a number of consecutive orthogonal frequency domain multiplexing (OFDM) symbols in the time domain and consecutive subcarriers in the frequency domain. Each column in the resource block corresponds to an OFDM symbol. A resource element group is used to define the mapping of control channels to resource elements. A resource element group is a set of resource elements in the same column or symbol. The number of resource element groups in a given symbol over one resource block can be two or three depending on the number of cell-specific reference signals that are configured. For example, in FIG. 3, each of symbols 302, 304, and 306 for that resource block can include two or three resource element groups. The mapping of PDCCH data symbols to resource element groups is set forth in section 6.2.5 of 3GPP TS 36.211v10.3.0 (2011 September), the disclosure of which is incorporated herein by reference in its entirety.

A physical downlink control channel (PDCCH) is transmitted on an aggregation of one, two, four, or eight consecutive control channel elements (CCEs), where a control channel element corresponds to nine resource element groups. Thus, in FIG. 3, assuming one of the first three OFDM symbols 302, 304, or 306 carries 3 resource element groups for a resource block, one CCE in a symbol may spread over 3 resource blocks. The number of CCEs available in each subframe limits the maximum number PDCCH data and corresponding DCIs in that subframe. The number of CCEs per subframe depends on number of OFDM symbols for control channel data (PDCCH symbols), PHICH resources, and system bandwidth. For example, number of CCEs with a configuration of 20 MHz system bandwidth, 3 PDCCH symbols, and PHICH resource of $\frac{1}{6}^{th}$ is about 88. This means there can be a maximum of 88 DCIs in one subframe. From the available set of CCEs, eNode B selects one or a subset of CCEs to transmit PDCCH data for a specific UE. Selection of a specific subset of CCEs in a subframe for PDCCH data for a specific UE is a function of UE's RNTI value. In other words, each UE is assigned only within a subset of CCEs, called a search space, for PDCCH assignment, which is based on the UE's RNTI value.

The PDCCH supports multiple formats and the format governs the number of resource element groups used. Table 1 shown below illustrates PDCCH formats and corresponding number of resource element groups, number of CCEs and PDCCH data unit size.

TABLE 1

Supported PDCCH formats.

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Thus, decoding the PDCCH may include analyzing the first one, two or three OFDM symbols in each subframe (twice the time slot) to determine whether PDCCH data for each UE being simulated is carried by a given CCE or group of CCEs. The process must be repeated for each possible PDCCH format because simulator 200 does not know which PDCCH format was used by the eNode B in a given subframe.

Another requirement for a multi-UE simulator that simulates multiple UEs is to monitor different DCI formats. For example, section 5.3.3.1 of 3GPP TS 36.212, V10.3.0 (2011), the disclosure of which is incorporated herein by reference in its entirety, specifies DCI formats that can be used by the eNode B in transmitting the DCI to an UE. For example, DCI format 0 is used for scheduling of the PUSCH data in the uplink, DCI format 1 is used for the scheduling of one codeword of PDSCH data in the downlink, DCI format 1A is used for the compact scheduling of one PDSCH data, etc. Each DCI format has different parameters and size (number of bits) that must be decoded.

Because simulator 200 does not know which DCI format is used on the downlink channel, simulator 200 must blindly decode PDCCH for all possible DCI formats, which can result in multiple valid DCI types for the same CCE or group of CCEs. For example, DCI formats 1 and 1A may decode for the same set of CCEs, and both DCIs may correspond to attached UEs. However, only DCI format 1 was actually transmitted. As a result, simulator 200 must perform one or more of the steps listed below to identify one DCI as true or valid and/or identify the other as false.

The different PDCCH formats described above with regard to Table 1 correspond to different aggregation levels. For example, PDDCH format zero corresponds to aggregation level 1, and PDDCH format 2 corresponds to aggregation level 4. The aggregation level defines the number of control channel elements used to carry the PDCCH data for a particular UE. The possible UE-specific aggregation levels are 1, 2, 4, and 8. In addition, there are common aggregation levels of 4 and 8 which relate to common control information. Table 2 shown below illustrates exemplary aggregation levels that may be monitored by a UE or a device simulating multiple UEs.

TABLE 2

PDCCH candidates monitored by a UE.

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Thus, for a given set of control channel elements, for aggregation level 1, simulator 200 must analyze 6 CCEs depending on the RNTI value in the set to determine whether the 6 CCEs contain a DCI for a UE being simulated. Simulator 200 must then analyze the 12 CCEs depending on the RNTI value for aggregation level 2 to determine whether the 12 CCEs contain the DCI for the UE being simulated. The process must be repeated for aggregation levels 4 and 8, because simulator 200 does not know what aggregation level was used to transmit the DCI for a given UE. Moreover, all of the aggregation levels must be tested for each UE being simulated. This process may result in plural DCI values, some of which fall within circles 102 and 104 but that may not fall within circle 100 illustrated in FIG. 1. DCIs outside of circle 102 may be excluded as false because these DCIs do not correspond to UEs being simulated. However, DCIs within circle 102 correspond to UEs being simulated, but cannot be blindly accepted as valid because some of the DCIs may not have been transmitted by the eNode B. Because simulator 200 does not know which DCIs were transmitted during a given interval, false DCI detection mitigation may be implemented by simulator 200.

Returning to FIG. 2, control DSP 208 decodes DCIs received from downlink signal chain processing module 206. For DCIs with downlink channel information, control DSP 208 sends a resource mapping (i.e., frequency, modulation, data block size, etc.) to downlink signal chain processing module 206 so that downlink signal chain processing module 206 can decode the downlink data on the PDSCH channel. In some embodiments, downlink signal chain processing module 206 may perform channel de-mapping or delineation of data for one or more UEs, demodulating and/or rate de-matching. A downlink channel decoder 210 decodes downlink data using a specified algorithm, such as Turbo decoding. MAC/RLC layer module 212 performs media access control (MAC) and radio link control (RLC) layer processing of received data.

For DCIs with uplink channel information, control DSP 208 sends uplink grant information to uplink DSP 214 and/or RLC/MAC layer module 212, and a resource mapping (i.e., frequencies, modulation, etc.) to uplink signal processing module 216. Uplink DSP 214 generates uplink frames using the data blocks received from MAC/RLC layer module 212 and transmits them to uplink signal chain processing module 216 for transmission over the radio link via CPRI module 204 and radio head 202. Optionally, as stated above, uplink data may be sent directly to the eNode B under test from CPRI module 204 via a wired interface, if it is desirable to test LTE functionality of the eNode B other than the radio interface.

According to an embodiment of the subject matter described herein, downlink signal chain processing module 206 includes a blind DCI decoder 218 that performs blind DCI decoding. Blind DCI decoding includes using the radio network temporary identifier (RNTI) value for each attached UE being simulated by simulator 200 during a given transmission time interval to detect or extract PDCCH data. In one embodiment, blind DCI decoder 218 monitors a set of PDCCH candidates (a set of consecutive CCEs on which the PDCCH could be mapped) in every subframe. Monitoring the PDCCH candidates includes identifying possible valid DCIs that are present in a subframe.

A false DCI detection mitigation module 220 performs various false DCI detection countermeasures to identify valid and/or invalid DCIs from the DCIs detected using blind DCI decoding. DCI mitigation module 220 may be implemented by control DSP 208 as illustrated in FIG. 2, by downlink signal chain processing module 206, by a combination of control DSP 208 and downlink signal chain processing module 206 and control DSP 208 or by a stand-alone processing element.

As a preliminary false DCI detection countermeasure, blind DCI decoder 218 may filter CCEs with energy detection before blind DCI decoding. The goal is to select CCEs with significant energy and drop the remaining CCEs with no or little energy. From the received radio signal, downlink signal chain processing module 206 may obtain the reference energy level per resource element from the downlink Reference Signal (RS). Downlink signal chain processing module 206 may mark or demap all CCEs in the subframe based on the type of control channel information (PHICH resource, PCFICH, etc.). For each CCE that belong to PDCCH, blind DCI decoder 218 may compute the average energy per resource element. Blind DCI decoder 218 may select CCEs that have the same or higher energy level than the average energy level with some tolerance. Blind DCI decoder 218 may drop from the list of CCEs for which blind DCI decoding is to be performed CCEs that do not have at least the reference energy level or a threshold set by other functions.

Another false DCI detection mitigation countermeasure that may be implemented is to choose DCI values with higher aggregation levels if more than one DCI computes for the same UE with overlapping CCEs. For example, false DCI detection mitigation module 220 may identify all DCIs in a given downlink subframe that correspond to the same RNTI or user equipment (UE). If there are plural DCIs for the same UE with different aggregation levels and overlapping CCEs, it is more likely that the DCI with the higher aggregation level is valid. As such, false DCI detection mitigation module 220 may select as valid or true the DCI with the higher aggregation level and the corresponding CCE groups.

Another false DCI detection mitigation algorithm that may be implemented is to choose the DCI with the shorter length (fewer bits) when two different DCIs for different UEs with the same aggregation level but different DCI formats are decoded for the same CCE space. For example, if DCIs for UE 1 and UE 2 and aggregation level 1 correctly decode for the same set of CCEs, and the DCI for UE 1 is DCI format 0 and the DCI for UE 2 is DCI format 1, false DCI detection mitigation module 220 may select as valid or true the DCI format 0. DCI format 0 has a shorter length than DCI format 1. It has been determined that DCIs with the shorter length are more likely to be accurate.

Another false DCI detection mitigation algorithm that may be implemented by false DCI detection mitigation module 220 is to choose the DCI of the UE with the higher aggregation level if more than one UE DCI decodes for overlapping CCE space and different aggregation levels. For example, if a CCE group decodes DCIs for UE 1 and UE 2, and the aggregation level for UE 1 is 1 while the aggregation level for the DCI for UE 2 is 4, false DCI detection mitigation module 220 may select as valid the DCI for UE 2 and the corresponding CCE groups. False DCI detection mitigation module 220 may drop the DCI for UE 1.

Yet another false DCI detection mitigation countermeasure that may be implemented by module 220 is to check for invalid parameters during the decoding of a DCI. For example, a DCI may decode into one or many DCI formats each of which carries parameters, such as the resource allocation header, resource block assignment, modulation and coding scheme, HARQ process number, new data indicator, redundancy version, TPC command, and downlink assignment index. Any one or more of these and other parameters specified in section 5.3.3.1 of the above-referenced 3GPP TS 36.212 v10.3.0 (2011 September) may be decoded and compared against expected or allowed values. If the parameter value is a value expected by simulator 200, then the parameter may be marked as valid. If one or more of the parameters do not decode to an expected value, the corresponding DCI may be indicated as false.

Yet another false DCI detection countermeasure that may be implemented by false DCI detection mitigation module 220 is to check the PDSCH energy on resource blocks or resource elements for DCIs that have passed previous levels of screening. For example, assuming that the DCIs are determined to be potentially valid after one or more of the above-referenced steps, the DCIs may be decoded to determine the resource blocks or resource elements that correspond to the PDSCH channel. False DCI detection mitigation module 220 may then detect the energy on the resource blocks for a given PDSCH. If there is no energy in any of the resource blocks coded for that PDSCH, then the DCI may be discarded as false. For example, referring again to FIG. 3, if the decoding of a particular DCI indicates that resource block 308 corresponds to the PDSCH for a given DCI and the energy of resource block 308 is 0, the DCI may be excluded as false. In addition or alternatively, if the energy of resource block 308 is above a threshold level, the DCI may be indicated as valid.

Another similar test that may be performed is to determine whether PDSCH resource blocks for two different DCIs that are determined to be potentially valid overlap. For example, false DCI detection mitigation module 220 may determine that two different DCIs are potentially valid using one or more of the steps described above. False DCI detection mitigation module 220 may then decode the DCIs to identify the resource blocks that correspond to the PDSCH data for each DCI. Referring to FIG. 3, false DCI detection mitigation module 220 may determine that the resource blocks for the PDSCH data for the two DCIs overlap between resource blocks 308 and 310. In such a scenario, false DCI detection mitigation module 220 may check the energy level of the non-overlapping resource blocks for the PDSCH data for each DCI. If one of the non-overlapping regions is determined to have little or no energy, then the DCI corresponding to that PDSCH data may be identified as false and discarded. In an another embodiment, different DCIs corresponding to PDSCH data with overlapping resource blocks but only one of the DCIs has non-overlapping resource block, false DCI detection mitigation module 220 may determine the energy level for the non-overlapping resource blocks for the PDSCH data for that DCI. If the non-overlapping region is determined to have sufficient energy, then the DCI corresponding to this PDSCH is true and valid, and the other DCI is determined to be false. Similarly, if the non-overlapping region is determined to have little or no energy, then the DCI corresponding to the other PDSCH may identified as true and valid. In another embodiment, if there is complete overlap and the PDSCH channels for both DCIs pass the energy test, DCI detection mitigation module 220 may decode each PDSCH, determine whether each corresponding CRC passes, and discard the DCI whose CRC does not pass.

Yet another false DCI detection countermeasure that may be implemented by false DCI detection mitigation module 220 is to check for DCIs with overlapping PUSCH resource blocks. For the DCIs that are detected using blind decoding, false DCI detection module 220 may determine the resource blocks allocated for PUSCH data. If two DCIs have overlapping PUSCH resource blocks, false DCI detection module 220 may do one or more of the following as false DCI detection countermeasure: a) Drop both DCIs as invalid; b) Select one of the DCIs as valid using a random selection algorithm; c) Select the DCI with the higher aggregation level as valid; or d) Check the DCI for any unexpected or invalid parameter values and discard the DCI with unexpected or invalid parameter values.

In one implementation, blind DCI decoder 218 performs blind DCI decoding through each of the aggregation levels and orders the incoming DCIs in descending order according to aggregation level and ascending order according to DCI payload size. The order of DCI detection helps the Blind DCI decoder to tag any later DCIs with the same or overlapping CCEs as the earlier detected DCIs. Blind DCI decoder 218 may also keep track of the CCE number for any DCI. Since DCIs should not have overlapping CCE space, any DCIs detected later that has overlapping CCEs may be tagged.

The detected DCI payload along with the overlap tag may be passed to control DSP 208. Control DSP 208 coordinates the decoding of the downlink shared data channel (PDSCH). In particular, Control DSP 208 decodes DCIs and builds resources mapping to decode the corresponding PDSCH data. During this process if the Control DSP 208 finds an overlap between the PDSCH resources control DSP 208 may use the overlap tag to identify valid and invalid DCIs. If there is overlap, control DSP 208 may check whether the corresponding DCIs are tagged. If both are tagged, the control DSP 208 may select as valid the DCI with the higher aggregation level and/or shorter DCI payload. If the DCIs are not tagged, control DSP 208 may verify the DCI parameters and discard the DCI with invalid parameters or control DSP 208 may randomly discard one of the DCIs.

Similarly, for uplink, control DSP 208 may determine whether there is overlap between the PUSCH resource element blocks assigned for different DCIs. If there is overlap between the PUSCH resource element blocks, control DSP 208 may determine whether the corresponding DCIs are tagged. If DCIs are tagged, then control DSP 208 may select as valid the DCI with the higher aggregation level. If the DCIs are not tagged, control DSP 208 may decode the DCI parameters and discard any DCIs with invalid parameters or control DSP 208 may randomly drop one of the DCIs.

Figure 4:
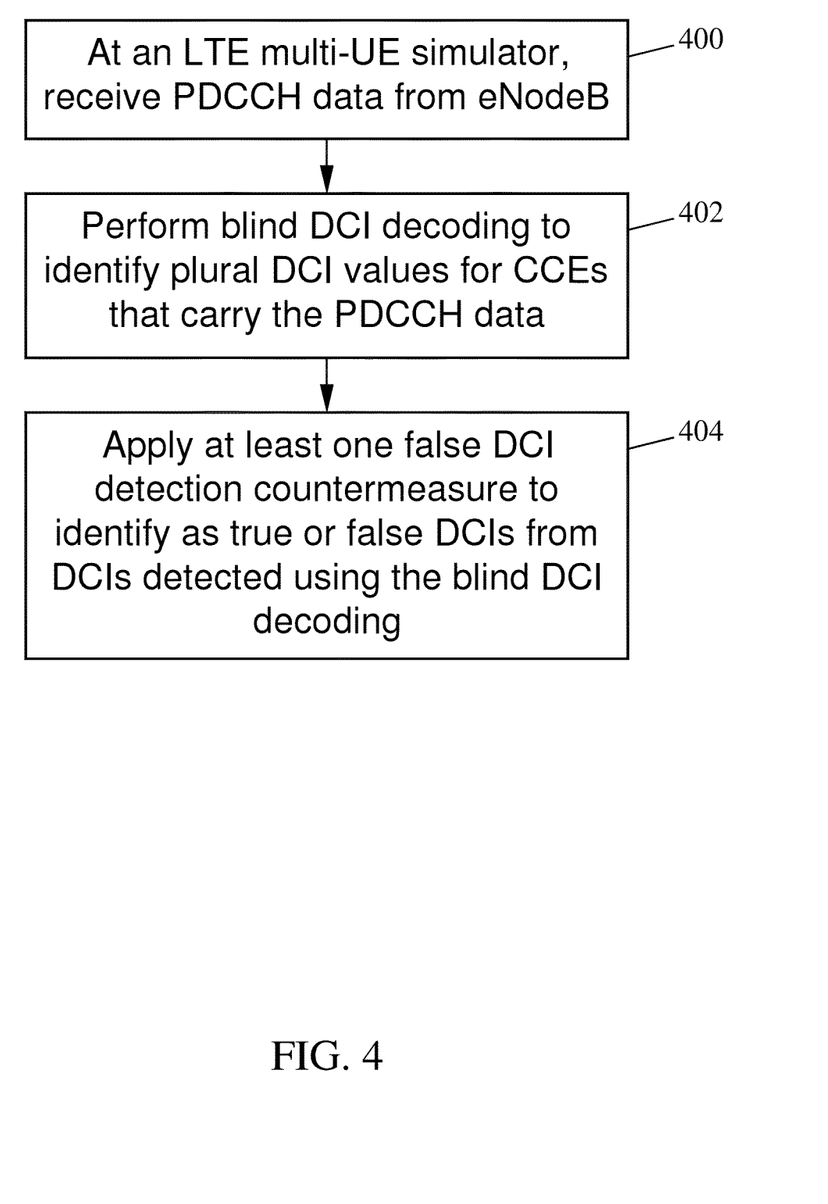
FIG. 4 is a flow chart illustrating exemplary steps performed by an LTE multi-UE simulator for reducing the impact of false DCI detection according to an embodiment of the subject matter described herein.

FIG. 4 is a flow chart illustrating exemplary overall steps for false DCI detection mitigation according to an embodiment of the subject matter described herein. Referring to FIG. 4, in step 400, an LTE multi-UE simulator receives PDCCH data from the eNode B. For example, simulator 200 may receive a resource block, such as that illustrated in FIG. 3, from an eNode B under test. In step 402, the multi-UE simulator performs blind DCI decoding to identify DCI values for CCEs that carry the PDCCH data. For example, simulator 200 may decode the resource elements in symbols 302, 304, and 306 and decode the corresponding DCI values that are present at all possible aggregation levels being monitored using RNTIs of all UEs being simulated. In step 402, the simulator applies at least one false DCI detection countermeasure to identify as true or false DCIs from the DCIs detected using the blind DCI decoding. For example, simulator 200 may apply any one or more of the countermeasures described above to identify true DCIs and exclude false DCIs from further processing.

Figure 5:
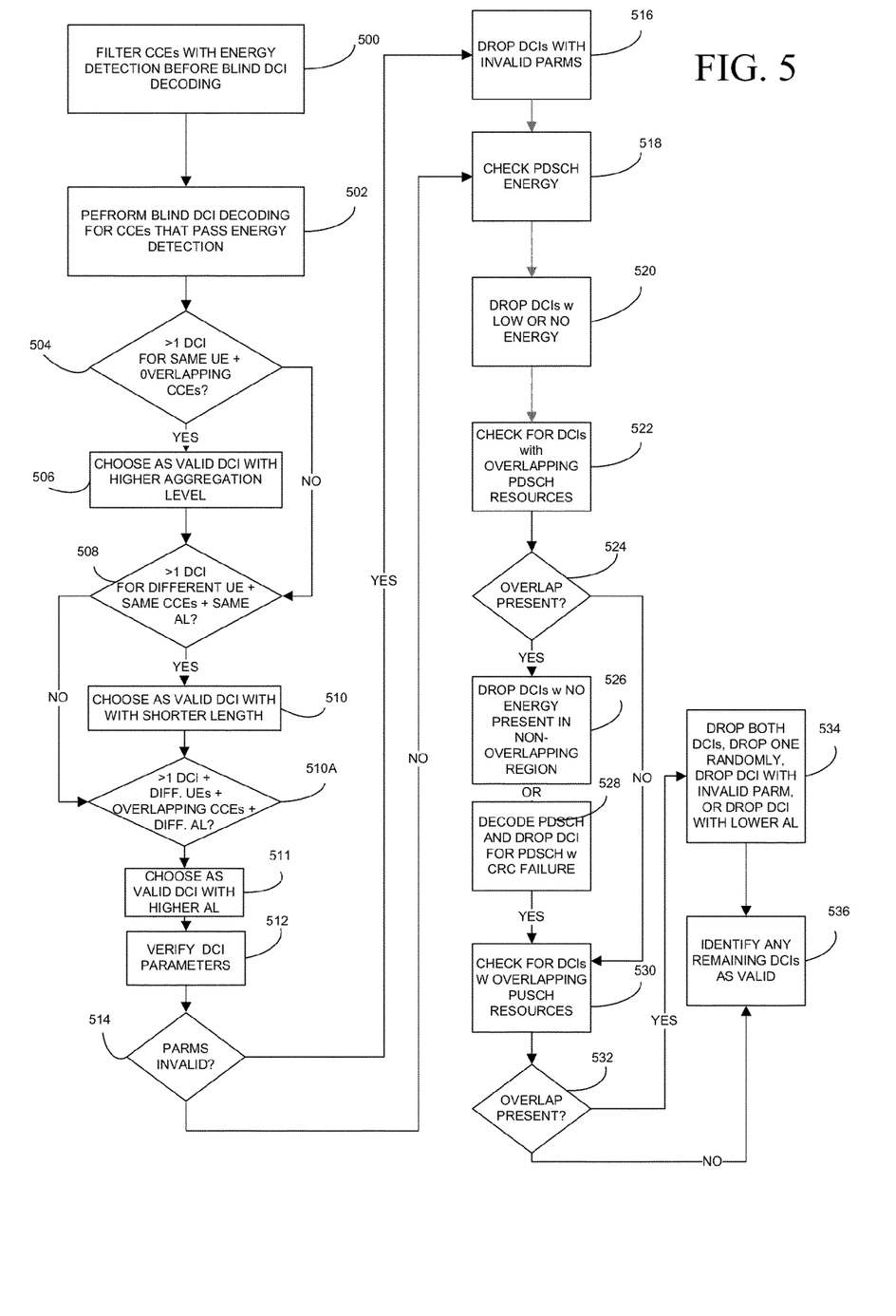
FIG. 5 is a flow chart illustrating an exemplary process for applying false DCI detection countermeasures according to an embodiment of the subject matter described herein.

FIG. 5 is a flow chart illustrating an exemplary process for applying DCI detection countermeasures according to an embodiment of the subject matter described herein. Referring to FIG. 5, in step 500, simulator 200 filters CCEs with energy detection before performing blind DCI decoding. For example, as set forth above, simulator 200 may exclude from further DCI decoding CCEs whose energy level is below a reference energy level. In step 502, for the DCIs that pass the energy detection, simulator 200 performs blind DCI decoding to identify all possible DCIs for all possible aggregation levels and DCI formats within a subframe. As set forth above, blind DCI decoding may decode DCIs for attached UEs that were not transmitted by the eNode B under test in a given subframe.

In steps 504 and 506, simulator 200 checks whether more than one DCI decodes for the same UE with overlapping CCE space and selects the DCI with the higher aggregation level if more than one DCI decodes for the same UE with overlapping CCE space. For example, if two valid DCIs decode for the same UE with overlapping CCEs, the DCI with the higher aggregation level is identified as valid and the DCI with the lower aggregation level is identified as invalid.

In steps 508 and 510, simulator 200 determines whether plural DCIs decode for different UEs with the same CCE group and the same aggregation level. If more than one DCI decodes for different UEs with the same CCE group and the DCIs have the same aggregation level, the DCI with the shorter length may be selected as valid.

In steps 510A and 511, simulator 200 checks whether more than one DCI decodes for different UEs with overlapping CCEs and different aggregation levels. If this condition is true, the DCI with the higher aggregation level is selected as valid.

In steps 512, 514, and 516 simulator 200 verifies DCI parameters for DCIs and discards any DCIs with invalid parameters.

In step 518, simulator 200 determines the PDSCH resource blocks assigned to each DCI that was decoded and determines the energy levels for the PDSCH resource blocks. In step 520, simulator 200 discards any DCIs with PDSCH resource blocks with and energy level that is below a threshold value.

In steps 522 and 524, simulator 200 checks for DCIs with PDSCH resource block overlap. If overlap is determined to be present, control proceeds to step 526 or step 528, depending on the desired implementation. In step 526, DCIs with no or low energy present in non-overlapping PDSCH resource block regions are discarded. In step 528, both PDSCH resource blocks may be decoded, and the PDSCH with a CRC failure may be discarded.

In steps 530 and 532, simulator 200 checks for DCIs with PUSCH resource block overlap. If overlap is determined to be present, control proceeds to step 534 where both DCIs may be dropped, one may be dropped randomly, any DCI whose parameters decode as invalid may be dropped, or the DCI with the lower aggregation level may be dropped.

Once all of the tests have been performed, control proceeds to step 536 where any remaining DCIs are identified as valid. Valid DCIs may be used by simulator 200 to decode downlink data and formulate uplink data transmissions for UEs being simulated. Because the effect of false DCI decoding is reduced, the likelihood of valid multi-UE simulation is increased.

The subject matter described herein for reducing the impact of false DCI detection for LTE PDCCH data is not limited to expressly identifying true DCIs, expressly identifying false DCIs, expressly selecting DCIs identified as true or expressly excluding DCIs identified as false. It is understood that identifying DCIs as true may be achieved by excluding or discarding all DCIs that fail a given test and that identifying DCIs as false may be achieved by only selecting DCIs that pass a given test.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for reducing the impact of false downlink control information (DCI) detection in long term evolution (LTE) physical downlink control channel (PDCCH) data, the method comprising:
in an LTE multi-user equipment (multi-UE) simulator:
simulating a plurality of UEs attached to an evolved node B (eNode B), the UEs having different radio network temporary identifier (RNTI) values;
receiving PDCCH data from the eNode B;
applying blind DCI decoding to decode at least one DCI value from channel control elements (CCEs) that carry the PDCCH data, wherein applying blind DCI decoding includes using the different RNTI values for all of the different attached UEs being simulated by the multi-UE simulator during a given transmission time interval to monitor a set of PDCCH candidates and identify possible valid DCIs for all of the different attached UEs being simulated; and
applying at least one false DCI detection countermeasure to identify true or false DCIs from the DCIs detected using the blind decoding.

2. The method of claim 1 comprising, prior to performing the blind DCI decoding, filtering the CCEs with energy detection to exclude, from the blind DCI decoding, CCEs with energy levels below a threshold.

3. The method of claim 1 wherein applying at least one DCI detection countermeasure includes identifying a DCI with a higher aggregation level as true if plural DCIs are decoded for the same UE with at least one overlapping CCE and different aggregation levels.

4. The method of claim 1 wherein applying at least one false DCI detection countermeasure includes identifying as true a DCI with a shorter length if plural different DCIs for different UEs are decoded with the same CCEs and the same aggregation level.

5. The method of claim 1 wherein applying at least one false DCI detection countermeasure includes identifying as true a DCI with a higher aggregation level if plural different DCIs for different UEs are decoded with at least one overlapping CCE and different aggregation levels.

6. The method of claim 1 wherein applying at least one false DCI detection countermeasure includes excluding from consideration as true DCIs whose parameters decode as invalid.

7. The method of claim 1 wherein applying at least one false DCI detection countermeasure includes identifying as false, a DCI whose physical downlink shared channel (PDSCH) energy is below a predetermined threshold.

8. The method of claim 1 wherein applying at least one false DCI detection countermeasure includes identifying DCIs with overlapping physical downlink shared channel (PDSCH) resource elements and, from the DCIs with overlapping PDSCH resource elements, identifying as false, one of the DCIs in response to determining that a non-overlapping portion of that DCI's PDSCH resource elements have an energy level that is below a predetermined threshold.

9. The method of claim 1 wherein applying at least one false DCI detection countermeasure includes identifying DCIs with overlapping physical downlink shared channel (PDSCH) resource blocks, decoding the PDSCH resource blocks and discarding any DCIs with cyclical redundancy check (CRC) failures.

10. The method of claim 1 wherein applying at least one false DCI detection countermeasure comprises identifying DCIs with overlapping physical uplink shared channel (PUSCH) resource blocks and selectively dropping predetermined ones of the DCIs with overlapping PUSCH resource blocks.

11. The method of claim 10 wherein selectively dropping selective ones of the DCIs includes dropping all of the DCIs with overlapping PUSCH resource blocks, randomly dropping the DCIs with overlapping PUSCH resource blocks, dropping DCIs from the DCIs with overlapping PUSCH resource blocks whose parameters decode as invalid, or dropping DCIs with lower aggregation levels from the DCIs with overlapping PUSCH resource blocks.

12. The method if claim 1 wherein applying blind DCI decoding includes identifying DCIs with overlapping CCEs and wherein applying at least one false DCI detection countermeasure includes applying the false DCI detection countermeasure to the DCIs that are identified as having overlapping CCEs.

13. A method for reducing the impact of false downlink control information (DCI) detection in long term evolution (LTE) physical downlink control channel (PDCCH) data, the method comprising:
in an LTE multi-UE simulator:
receiving PDCCH data from an evolved node B (eNode B);
applying blind DCI decoding to decode at least one DCI value from channel control elements (CCEs) that carry the PDCCH data; and
applying at least one false DCI detection countermeasure to identify true or false DCIs from the DCIs detected using the blind decoding;
wherein applying blind DCI decoding includes identifying DCIs with overlapping CCEs and wherein applying at least one false DCI detection countermeasure includes applying the false DCI detection countermeasure to the DCIs that are identified as having overlapping CCEs; and
wherein, for the DCIs with overlapping CCEs, checking for overlapping physical downlink shared channel (PDSCH) resource blocks, and, in response to detecting DCIs with overlapping PDSCH resource blocks, performing DCI parameter decoding to identify one of the DCIs with overlapping PDSCH resource blocks and overlapping CCEs as true.

14. A method for reducing the impact of false downlink control information (DCI) detection in long term evolution (LTE) physical downlink control channel (PDCCH) data, the method comprising:
in an LTE multi-UE simulator:
receiving PDCCH data from an evolved node B (eNode B);
applying blind DCI decoding to decode at least one DCI value from channel control elements (CCEs) that carry the PDCCH data; and
applying at least one false DCI detection countermeasure to identify true or false DCIs from the DCIs detected using the blind decoding;
wherein applying blind DCI decoding includes identifying DCIs with overlapping CCEs and wherein applying at least one false DCI detection countermeasure includes applying the false DCI detection countermeasure to the DCIs that are identified as having overlapping CCEs; and
for the DCIs with overlapping CCEs, checking for overlapping physical uplink shared channel (PUSCH) resource blocks, and, in response to detecting overlapping PUSCH resource blocks, performing DCI parameter decoding to identify one of the DCIs with overlapping PUSCH resource blocks and overlapping CCEs as true.

15. A system for reducing the impact of false downlink control information (DCI) detection in long term evolution (LTE) physical downlink control channel (PDCCH) data, the system comprising:
an LTE multi-user equipment (multi-UE) simulator that simulates a plurality of UEs attached to an evolved node B (eNode B), the UEs having different radio network temporary identifier (RNTI) values, the multi-UE simulator including:
a blind DCI decoder for receiving PDCCH data from the eNode B and for applying blind DCI decoding to decode at least one DCI value from channel control elements (CCEs) that carry the PDCCH data, wherein applying blind DCI decoding includes using the different RNTI values for all of the different attached UEs being simulated by the multi-UE simulator during a given transmission time interval to monitor a set of PDCCH candidates and identify possible valid DCIs for all of the different attached UEs being simulated; and
a false DCI detection mitigation module for applying at least one false DCI detection countermeasure to identify true or false DCIs from the DCIs detected using the blind DCI decoding.

16. The system of claim 15 wherein the blind DCI decoder is configured to, prior to performing the blind DCI decoding, filter the CCEs with energy detection to exclude, from the blind DCI decoding, CCEs with energy levels below a threshold.

17. The system of claim 15 wherein the false DCI detection mitigation module is configured to identify a DCI with a higher aggregation level as true if plural DCIs are decoded for the same UE with at least one overlapping CCE and different aggregation levels.

18. The system of claim 15 wherein the false DCI detection mitigation module is configured to identify as true a DCI with a shorter length if plural different DCIs for different UEs are decoded for the same CCEs and the same aggregation level.

19. The system of claim 15 wherein the false DCI detection mitigation module is configured to identify as true a DCI with a higher aggregation level if plural different DCIs for different UEs are decoded with at least one overlapping CCE and different aggregation levels.

20. The system of claim 15 wherein the false DCI detection mitigation module is configured to identify as false, a DCI whose physical downlink shared channel (PDSCH) energy is below a predetermined threshold.

21. The system of claim 15 wherein the false DCI detection mitigation module is configured to identify DCIs with overlapping physical downlink shared channel (PDSCH) resource elements and, from the DCIs with overlapping PDSCH resource elements, identify as false, one of the DCIs in response to determining that a non-overlapping portion of that DCI's PDSCH resource elements have an energy level that is below a predetermined threshold.

22. The system of claim 15 wherein the false DCI detection mitigation module is configured to identify DCIs with overlapping physical downlink shared channel (PDSCH) resource blocks, decode the PDSCH resource blocks and discarding any DCIs with cyclical redundancy check (CRC) failures.

23. The system of claim 15 wherein the false DCI detection mitigation module is configured to identify DCIs with overlapping physical uplink shared channel (PUSCH) resource blocks and selectively drop predetermined ones of the DCIs with overlapping PUSCH resource blocks.

24. The system of claim 23 wherein the false DCI detection mitigation module is configured to drop all of the DCIs with overlapping PUSCH resource blocks, randomly drop the DCIs with overlapping PUSCH resource blocks, drop DCIs from the DCIs with overlapping PUSCH resource blocks whose parameters decode as invalid, or drop DCIs with lower aggregation levels from the DCIs with overlapping PUSCH resource blocks.

25. The system of claim 15 wherein the false DCI detection mitigation module is configured to identify DCIs with overlapping CCEs and to apply the false DCI detection countermeasure to the DCIs that are identified as having overlapping CCEs.

26. The system of claim 15 wherein the false DCI detection mitigation module is configured to exclude from consideration as true DCIs whose parameters decode as invalid.

27. A system for reducing the impact of false downlink control information (DCI) detection in long term evolution (LTE) physical downlink control channel (PDCCH) data, the system comprising:
    an LTE multi-UE simulator including:
        a blind DCI decoder for receiving PDCCH data from an evolved node B (eNode B) and for applying blind DCI decoding to decode at least one DCI value from channel control elements (CCEs) that carry the PDCCH data; and
        a false DCI detection mitigation module for applying at least one false DCI detection countermeasure to identify true or false DCIs from the DCIs detected using the blind DCI decoding;
    wherein the false DCI detection mitigation module is configured to identify DCIs with overlapping CCEs and to apply the false DCI detection countermeasure to the DCIs that are identified as having overlapping CCEs; and
    wherein the false DCI detection mitigation module is configured to, for the DCIs with overlapping CCEs, check for overlapping physical downlink shared channel (PDSCH) resource blocks, and, in response to detecting overlapping PDSCH resource blocks, perform DCI parameter decoding to identify one of the DCIs with overlapping PDSCH resource blocks and overlapping CCEs as true.

28. A system for reducing the impact of false downlink control information (DCI) detection in long term evolution (LTE) physical downlink control channel (PDCCH) data, the system comprising:
    an LTE multi-UE simulator including:
        a blind DCI decoder for receiving PDCCH data from an evolved node B (eNode B) and for applying blind DCI decoding to decode at least one DCI value from channel control elements (CCEs) that carry the PDCCH data; and
        a false DCI detection mitigation module for applying at least one false DCI detection countermeasure to identify true or false DCIs from the DCIs detected using the blind DCI decoding;
    wherein the false DCI detection mitigation module is configured to identify DCIs with overlapping CCEs and to apply the false DCI detection countermeasure to the DCIs that are identified as having overlapping CCEs; and
    wherein the false DCI detection mitigation module is configured to, for the DCIs with overlapping CCEs, check for overlapping physical uplink shared channel (PUSCH) resource blocks, and, in response to detecting overlapping PUSCH resource blocks, perform DCI parameter decoding to identify one of the DCIs with overlapping PUSCH resource blocks and overlapping CCEs as true.

29. A non-transitory computer readable medium having stored thereon executable instructions that when executed by the processor of a computer control the computer to perform steps comprising:
    at a long term evolution (LTE) multi-user equipment (multi-UE) simulator:
        simulating a plurality of UEs attached to an evolved node B (eNode B), the UEs having different radio network temporary identifier (RNTI) values;
        receiving PDCCH data from the eNode B;
        applying blind DCI decoding to decode at least one DCI value from channel control elements (CCEs) that carry the PDCCH data, wherein applying blind DCI decoding includes using the different RNTI values for all of the different attached UEs being simulated by the multi-UE simulator during a given transmission time interval to monitor a set of PDCCH candidates and identify possible valid DCIs for all of the different attached UEs being simulated; and
        applying at least one false DCI detection countermeasure to identify true or false DCIs from the DCIs detected using the blind decoding.

* * * * *